US012684330B2

(12) United States Patent
Stammers et al.

(10) Patent No.: US 12,684,330 B2
(45) Date of Patent: Jul. 14, 2026

(54) POLICY OPTIMIZATION FOR CELLULAR NETWORK DEPLOYMENT

(71) Applicant: Cisco Technology, Inc., San Jose, CA (US)

(72) Inventors: Timothy Stammers, Raleigh, NC (US); Rohan Koshy, Bengaluru (IN); Pratima Gupta, Hinjewadi (IN); Mamillapalli Venkata Naga Bhavana, Hinjewadi (IN); Suyog Subhash Belsare, Pradhikaran Nigdi (IN); Soufiane Cherkaoui Jaouad, Tracy, CA (US)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 18/954,776

(22) Filed: Nov. 21, 2024

(65) Prior Publication Data

US 2026/0143328 A1     May 21, 2026

(51) Int. Cl.
*H04W 8/18* (2009.01)
*H04L 9/40* (2022.01)
*H04L 12/14* (2006.01)
*H04L 41/0893* (2022.01)
*H04L 41/0894* (2022.01)

(52) U.S. Cl.
CPC ........... *H04W 8/18* (2013.01); *H04L 12/1407* (2013.01); *H04L 41/0893* (2013.01); *H04L 41/0894* (2022.05); *H04L 63/102* (2013.01)

(58) Field of Classification Search
CPC .. H04W 8/18; H04L 12/1407; H04L 41/0893; H04L 41/0894; H04L 63/102
See application file for complete search history.

(56) References Cited

U.S. PATENT DOCUMENTS 7,978,691 B1 * 7/2011 Cole ..................... H04W 40/24
                                                    370/254
9,179,007 B1 * 11/2015 Yadav ................. H04L 12/1407
(Continued)

OTHER PUBLICATIONS

Clarke, John, "What is Service Provisioning in Telecom?", Jul. 15, 2025, https://www.ohio.net/blog/what-is-service-provisioning-in-telecom (Year: 2025).*

(Continued)

*Primary Examiner* — Ramy M Osman
(74) *Attorney, Agent, or Firm* — Lee & Hayes, P.C.

(57) ABSTRACT
In one embodiment, a method for policy optimization for cellular network deployment includes determining, by a process, sets of policy mappings for individual subscribers among a plurality of network subscribers in a first network deployment and analyzing, by the process, the sets of policy mappings to determine a plurality of groupings for the individual subscribers. The method further includes assigning, by the process and according to the set of policy mappings and the plurality of groupings, the individual subscribers to at least one network deployment recommendation group among a plurality of network deployment recommendation groups and deploying, by the process, the individual subscribers according to the plurality of network deployment recommendation groups into a second network deployment.

19 Claims, 8 Drawing Sheets

(56)  References Cited

U.S. PATENT DOCUMENTS

| | | | | |
|---|---|---|---|---|
| 10,033,589 | B1 * | 7/2018 | Batta | H04L 47/78 |
| 2011/0167471 | A1 * | 7/2011 | Riley | H04W 8/18 |
| | | | | 726/1 |
| 2015/0005004 | A1 * | 1/2015 | Cuervo | H04W 64/00 |
| | | | | 455/456.1 |
| 2015/0103647 | A1 * | 4/2015 | Batz | H04W 48/04 |
| | | | | 370/230 |
| 2016/0006571 | A1 * | 1/2016 | Teittinen | H04L 41/0893 |
| | | | | 455/405 |
| 2019/0253960 | A1 * | 8/2019 | Hodroj | H04W 36/302 |
| 2020/0412653 | A1 | 12/2020 | Arora et al. | |
| 2022/0166799 | A1 * | 5/2022 | Johnson | H04W 12/71 |
| 2023/0027934 | A1 | 1/2023 | Raleigh et al. | |
| 2023/0412643 | A1 | 12/2023 | Stammers et al. | |
| 2024/0056321 | A1 | 2/2024 | Xu et al. | |
| 2025/0212077 | A1 * | 6/2025 | Murthy | H04W 36/12 |

OTHER PUBLICATIONS

ETI Software, "Telecom Provisioning Process Flow: Seamless Automation Enhances Customer Experience", accessed Feb. 25, 2026 https://etisoftware.com/center-of-excellence/provisioning/telecom-provisioning-process-flow/ (Year: 2026).*

* cited by examiner

POLICY OPTIMIZATION FOR CELLULAR NETWORK DEPLOYMENT

TECHNICAL FIELD

The present disclosure relates generally to computer networks, and, more particularly, to policy optimization for cellular network deployment.

BACKGROUND

Current cellular network deployment policy, particularly for consumer connectivity, and often for enterprise connectivity, generally relies on using a few policy variations across a large number of subscribers. In general, these policies are typically configured in a policy database with an entry for each subscriber, identified by an international mobile subscribed identity (IMSI), or other relevant, unique identifier that points to the policy to be applied.

Currently, the policy databases can be handled in one of two ways. In one approach, the policy database can be addressed by a policy control function based on subscriber IMSI in a distributed database. In another approach, the policy database can be local to a session management function where the policy selected by IMSI. In the latter, individual IMSIs are generally mapped to a particular IMSI range based on the local session management function policy selected by the individual IMSIs.

These methodologies can result in many millions of database records with the corresponding storage, compute, licensing, and configuration complexities associated with the volume of records in the external database approach. In the latter approach with a localized policy database, IMSI ranges may have to be carefully managed in order to minimize the number of local policy configuration entries.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a method for policy optimization for cellular network deployment includes determining, by a process, sets of policy mappings for individual subscribers among a plurality of network subscribers in a first network deployment and analyzing, by the process, the sets of policy mappings to determine a plurality of groupings for the individual subscribers. The method further includes assigning, by the process and according to the set of policy mappings and the plurality of groupings, the individual subscribers to at least one network deployment recommendation group among a plurality of network deployment recommendation groups and deploying, by the process, the individual subscribers according to the plurality of network deployment recommendation groups into a second network deployment. Other implementations are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
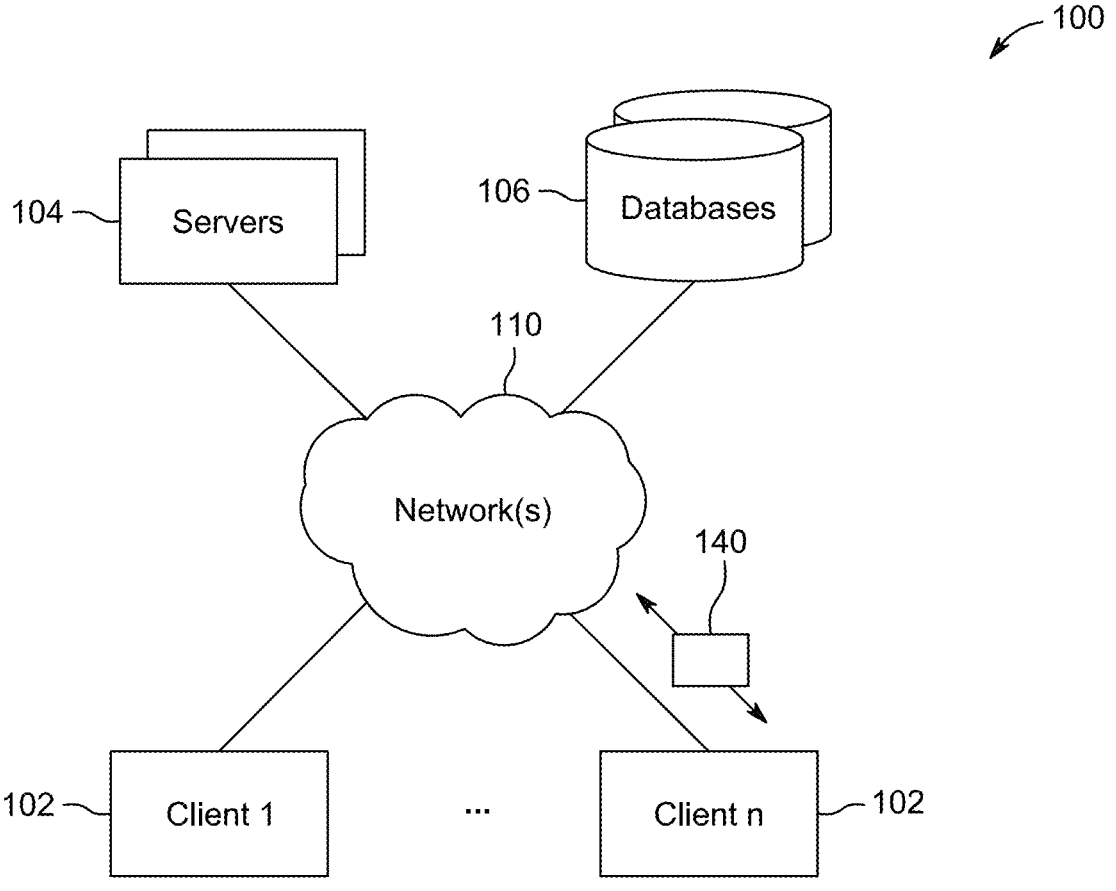
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
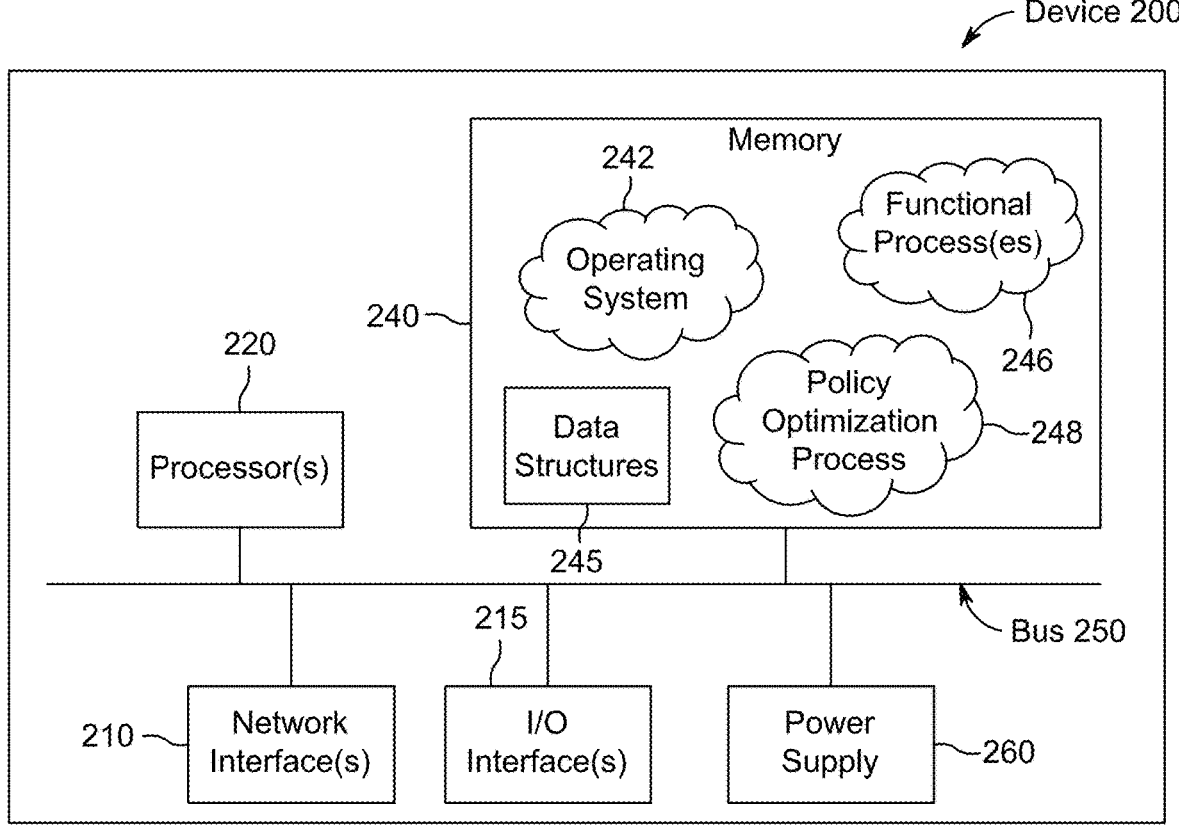
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a policy optimization process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, one or more functional processes 246 and/or policy optimization process (process 248) may include computer executable instructions that, when executed by processor(s) 220, cause device 200 to perform the techniques described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Policy Optimization for Cellular Network Deployment—

Because current cellular network deployments can require per-subscriber policy provisioning at a high scale (e.g., in the millions), a typical network may have upwards of ten thousand different policy use cases. This can lead current approaches to migrating network policies to a new network deployment to become problematic where subscriber grouping approaches are enabled. This is most readily seen in the costs associated with computing resources, such as processing resources, storage resources, memory resources, and energy usage resources, as well as licensing and other standardization and/or legal resources required to migrate network policies to a new network deployment.

A non-limiting example of a scenario in which at least some of these issues can arise is for a 4G evolved packet core (4G-EPC) to a 5G standalone (5G-SA) core migration. 5G-SA standards have enabled associating a subscriber with one or more groups. In this example, the group(s) are provisioned as part of a subscriber's profile and delivered to the session management and policy functions as a part of standard signaling exchanges. One of the main challenges in this example is how to "learn" the potential groupings of subscribers from an existing deployment and then make use of those groups as part of the deployment migration in order to reduce the policy provisioning burden for both local and external examples above.

The techniques herein provide mechanisms in which groupings based on subscriber policies are formed and optimized prior to migrating network policies to a new network deployment. In addition, the subscriber policies can be provisioned on a per group basis prior to migrating network policies to a new network deployment. As described in more detail herein, this can allow for a reduction in the costs associated with computing resources, as well as licensing and other standardization and/or legal resources to support a network migration, a network re-architecture, and/or a network deployment.

For example, the techniques herein pertain to a network deployment orchestration service for group provisioning and policy provisioning in a cellular network such as 5G that uses group-based policies where an international mobile subscribed identity (e.g., an IMSI 15-digit international mobile subscriber identity) can be assigned to one or more groups, including enterprise-based groups. The inputs to the service include data from a current network deployment (e.g., a 4G network, etc.) where the data is a set of local policies per IMSI from the packet core gateway and another set of policies per IMSI from a policy and charging rules function (PCRF) from which the service identifies a set of policies and a set of potential groupings of IMSIs. A grouping recommendation engine can refine the groupings and can output the results to a group provisioning function that sends the mapping to subscriber data management in the 5G network. Meanwhile, a policy provisioning function can send the group-based network policies to the policy server and the packet core gateway in the 5G network. Implementations are not limited to the use of IMSIs, however, and other unique identifiers may be used without departing from the scope of the disclosure. It is noted that, for simplicity, implementations herein are generally described with reference to the use of IMSIs.

Non-limiting examples of policies can include quality of service (QoS), bitrate subscription, uplink/downlink rate, applications (e.g., executable computer applications), parental control settings, subscriber data plans, etc.

Specifically, according to one or more embodiments of the disclosure as described in detail below, a method for policy optimization for cellular network deployment includes determining, by a process, sets of policy mappings for individual subscribers among a plurality of network subscribers in a first network deployment and analyzing, by the process, the sets of policy mappings to determine a plurality of groupings for the individual subscribers. The method further includes assigning, by the process and according to the set of policy mappings and the plurality of groupings, the individual subscribers to at least one network deployment recommendation group among a plurality of network deployment recommendation groups and deploying, by the process, the individual subscribers according to the plurality of network deployment recommendation groups into a second network deployment.

Figure 3:
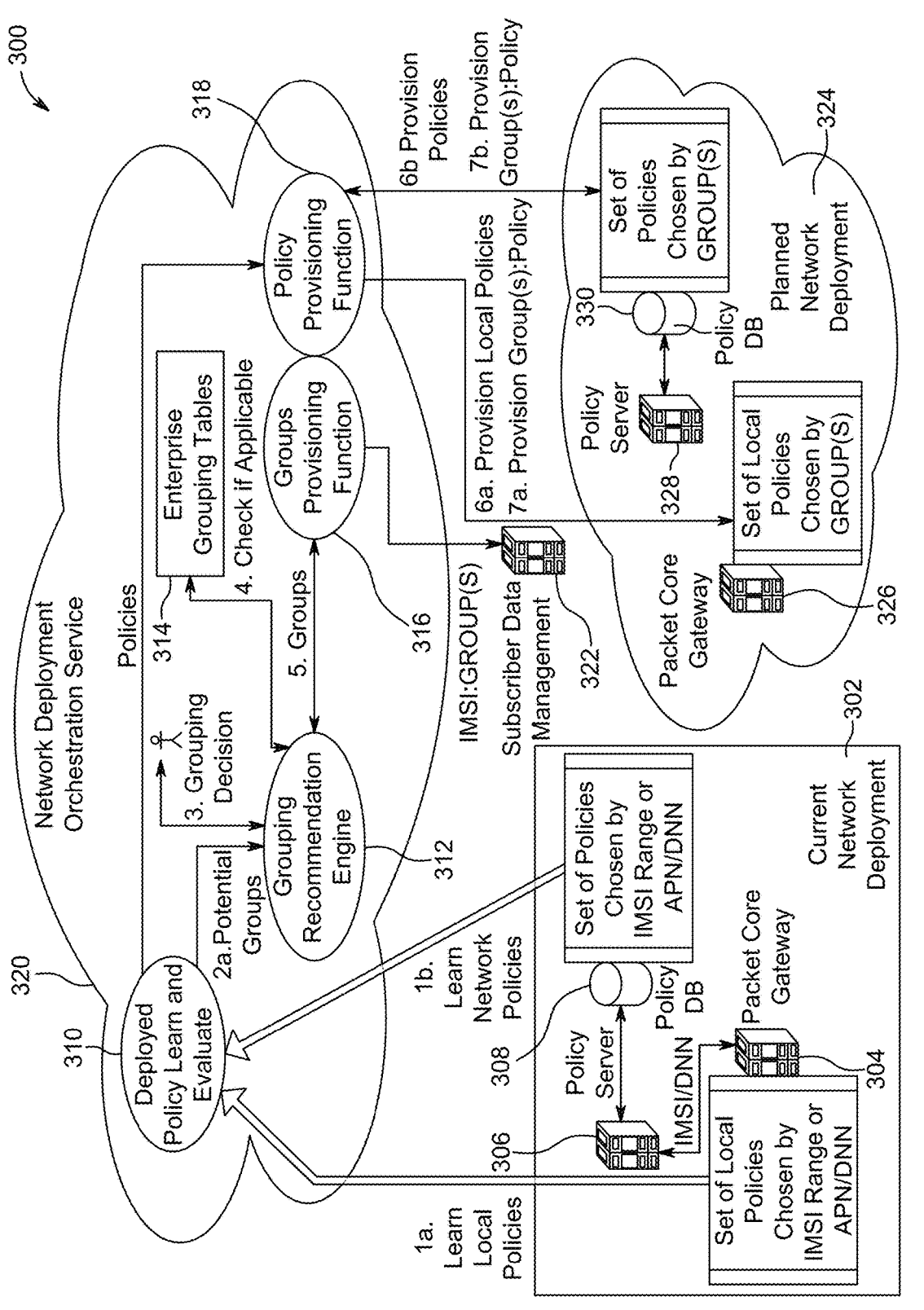
FIG. 3 illustrates an example high level system for policy optimization for cellular network deployment.

Operationally, FIG. 3 illustrates an example high level system for policy optimization for cellular network deployment. As shown in FIG. 3, the system 300 shows a current network deployment 302, a network deployment orchestration service 320, and a planned network deployment 324.

The current network deployment 302 can, for example, be a 4G cellular network, although implementations are not so limited. As shown in FIG. 3, the current network deployment 302 includes a packet core gateway 304, which can be communicatively coupled to a policy server 306. The policy server 306 can in turn be communicatively coupled to a policy database 308. In some implementations, the packet core gateway 304 can exchange IMSI and/or digital network name (DNN) information with the policy server 306, while the policy server 306 can exchange policy information with the policy database 308.

As shown in FIG. 3, the packet core gateway 304 can share a set of local policies chosen by IMSI range, DNN, and/or access point name (APN) with the network deployment orchestration service 320 to learn and/or evaluate the deployed policy, as shown at operation 310. For example, as shown at step 1a, the packet core gateway 304 can share a set of local policies with the network deployment orchestration service 320 in order for the network deployment orchestration service 320 to learn local policies associated with the current network deployment 302.

In addition, the policy database 308 can share a set of local policies chosen by IMSI range, DNN, and/or APN with the network deployment orchestration service 320 to learn and/or evaluate the deployed policy, as shown at operation 310. For example, as shown at step 1b, the policy database 308 can share a set of network policies with the network deployment orchestration service 320 in order for the network deployment orchestration service 320 to learn network policies associated with the current network deployment 302.

The network deployment orchestration service 320 can use the learned and/or evaluated deployed policies from operation 310 to, at step 2a, send a list of potential groups based on the learned and/or evaluated deployed policies to a grouping recommendation engine 312. In addition, network deployment orchestration service 320 can use the learned and/or evaluated deployed policies from operation 310 to send a list of policies based on the learned and/or evaluated deployed policies to a policy provisioning function 318.

At step 3, a grouping decision can optionally be made, for example, by a user (e.g., a sysadmin, administrator, etc.) in connection with the grouping recommendation engine 312. For example, in addition to automated decision making provided by the grouping recommendation engine 312, a user of the system 300 can provide grouping recommendations and/or input to facilitate grouping decisions based on policies associated with the subscribers.

At step 4, the grouping recommendation engine 312 can check if enterprise grouping tables 314 are applicable. For example, enterprise grouping tables 314 may have been previously formed that group certain enterprise devices based on enterprise policies. If such enterprise grouping tables 314 exist, the grouping recommendation engine 312 can learn these groups and associate relevant enterprise groups to recommended cellular groups at step 5.

As shown in FIG. 3, at step 5 the groups determined by the grouping recommendation engine 312 can be provided to a group provisioning function 316. In some implementations, the group provisioning function 316 can provide IMSI group(s) based on the groups received from the grouping recommendation engine 312 to a subscriber data management server 322. The subscriber data management server 322 can store the group information for later retrieval.

The policy provisioning function 318 can receive the policy information from the learned and/or evaluated deployed policies from operation 310 and can, at step 6a, provision local policies, which can be sent to the packet core gateway 326 of the planned network deployment 324. In addition, the policy provisioning function 318 can receive the policy information from the learned and/or evaluated deployed policies from operation 310 and can, at step 7a, provision group(s) policy, which can be sent to the packet core gateway 326 of the planned network deployment 324. The policies from step 6a and 7a can constitute a set of local policies chosen by group(s).

In addition, the policy provisioning function 318 can receive the policy information from the learned and/or evaluated deployed policies from operation 310 and can, at step 6b, provision policies, which can be sent to the policy database 330 of the planned network deployment 324. In addition, the policy provisioning function 318 can receive the policy information from the learned and/or evaluated deployed policies from operation 310 and can, at step 7b, provision group(s) policy, which can be sent to the policy database 330 of the planned network deployment 324. The policies from step 6b and 7b can constitute a set of policies chosen by group(s).

As shown in FIG. 3, the policy database 330 can be communicatively coupled to a policy server 328. The policy server 328 can retrieve the policies chosen by group(s) from the policy database 330 in order to carry out aspects of the present disclosure.

To summarize the foregoing discussion of FIG. 3, the system 300 may first learn relationships between policies and subscribers in the current network deployment 302. As discussed above, this can be performed using the network deployment orchestration service 320. Next, the policies are analyzed (e.g., at operation 310) and groups are recommended using the grouping recommendation engine 312. The groups are provisioned (e.g., using the group provisioning function 316) and the policies are provisioned (e.g., using the policy provisioning function 318) and to provision group to policy relationships in the network functionality of the planned network deployment 324. The new network (e.g., the planned network deployment 324) is then deployed.

In a non-limiting example, a procedure for policy optimization for cellular network deployment can include learning the existing subscriber to policy mappings as deployed in a 4G evolved packet core (EPC) network (e.g., the current network deployment 302) with packet data network gateway (PGW) combined with local policy and policy and charging rules function (PCRF) combined with external policy database information.

The procedure can further include analyzing potential groupings, as discussed above. In some implementations, analyzing the potential groupings can include receiving recommendations from a user (e.g., a sysadmin, administrator, network development team, etc.) as shown at step 3 in FIG. 3.

If the network (e.g., the current network deployment 302 and/or the planned network deployment 324) is a consumer-type cellular network, a 3rd Generation Partnership Project (3GPP) group for each of the groupings determined above can be identified. It is noted that an IMSI (e.g., a subscriber device) can be in one or more groups. Implementations are not limited to utilizing 3GPP groups, however, and other mobile telecommunications protocols are contemplated within the scope of the disclosure.

If the network (e.g., the current network deployment 302 and/or the planned network deployment 324) is an enterprise-type cellular network, a determination can be made as to whether the enterprise network already has a grouping approach in place. If the enterprise network already has a grouping approach in place, a determination can be made as to whether the existing enterprise cellular grouping policy should be re-used, or if new groupings should be generated. If the existing grouping approach is re-used, the enterprise groups can be learned, and an enterprise group can be associated to each of the cellular groupings. If the existing grouping approach is not re-used, a 3GPP group for each of the groupings determined above can be identified. It is noted that an IMSI (e.g., a subscriber device) can be in one or more groups. As discussed above, the procedure can further include recommendation of additional enterprise groupings (e.g., using the enterprise grouping tables 314).

Next, the groups can be provisioned for an IMSI to the subscriber profile associated with that particular IMSI. For each of the policies learned (e.g., the existing subscriber to policy mappings mentioned above), the new network (e.g., the planned network deployment 324) can provision policies and/or local policies to each instance of the policy database 330 using a session management function (SMF) combined with the local policy to the policy database 330 and/or to a secondary policy database (e.g., an external policy database when a 5G policy control function (PCF) is present) depending on the network deployment design of the planned network deployment 324.

The group to policy relationships for each instance stored in the local policy database and/or an external policy database can also be provisioned depending on the network deployment design of the planned network deployment 324.

Continuing with this non-limiting example, the policies can be applied to the planned network deployment 324 based on the groupings learned in the steps described above. In the case of local policies (e.g., when the local policy database is involved), these can be learned as part of session management retrieval on data session establishment, among other techniques. In the case of external policies (e.g., when an external policy database is involved), the groups can be provided as part of dynamic interactions between the SMF and PCF.

Figure 4A:
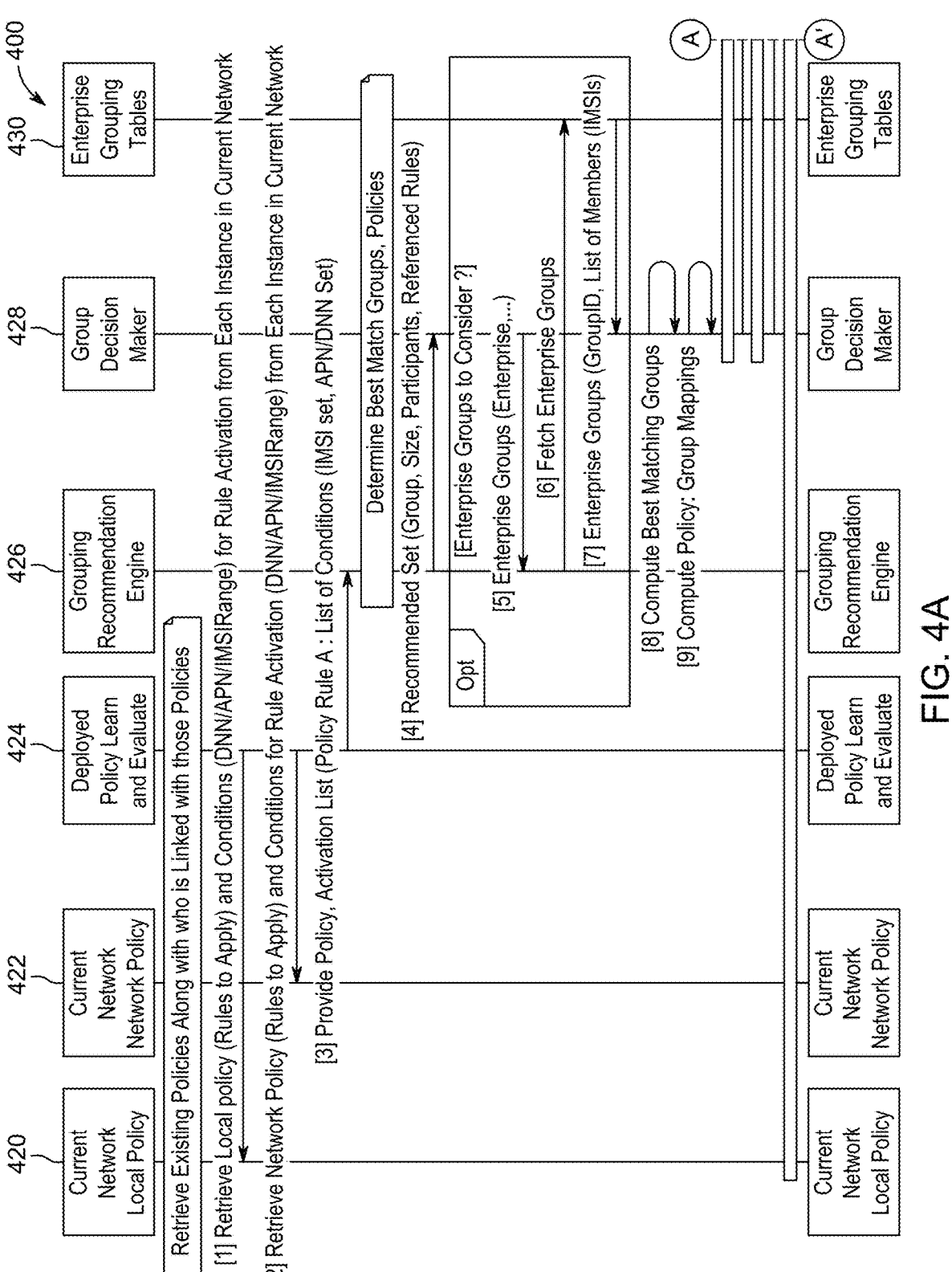
FIGS. 4A-4B illustrate an example call flow for policy optimization for cellular network deployment.
Figure 4B:
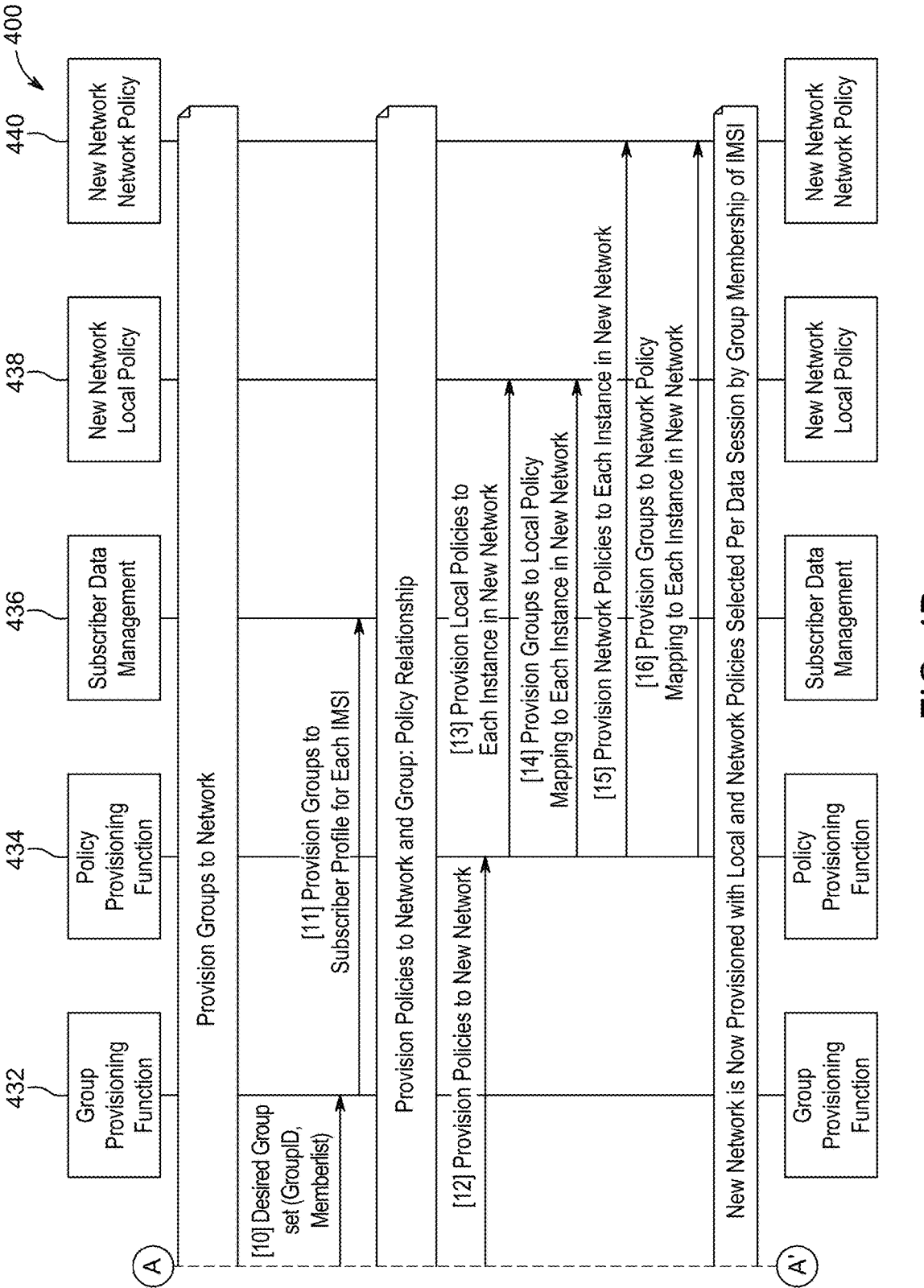

FIGS. 4A-4B illustrate an example call flow for policy optimization for cellular network deployment. The flow 400 shows the various steps that occur between the current network's local policy 420, the current network's network policy 422, the deployed policy learn and evaluate 424 phase, the grouping recommendation engine 426, the group decision maker 428, the enterprise grouping tables 430, the group provisioning function 432, the policy provisioning function 434, subscriber data management 436 server, the new network local policy 438, and the new network's network policy 440. In some implementations, the current network's local policy 420 and the current network's network policy 422 can be associated with the current network deployment 302 of FIG. 3; the deployed policy learn and evaluate 424 phase can be analogous to operation 310 of FIG. 3; the grouping recommendation engine 426 and/or the group decision maker 428 can be analogous to the grouping recommendation engine 312 of FIG. 3; the enterprise grouping tables 430 can be analogous to the enterprise grouping tables 314 of FIG. 3; the group provisioning function 432 can be analogous to the group provisioning function 316 of FIG. 3; the policy provisioning function 434 can be analogous to the policy provisioning function 318 of FIG. 3; the subscriber data management 436 can be analogous to the subscriber data management server 322 of FIG. 3; and the new network local policy 438 and the new network's network policy 440 can be associated with the planned network deployment 324 of FIG. 3.

As shown in FIGS. 4A-4B, the flow 400 begins with a series of operations to retrieve existing policies along with who (e.g., subscriber and/or IMSI) is linked with those policies. At operation [1], local policy rules to be applied and conditions (e.g., DNN, APN, IMSI range, etc.) for rule activation in each instance in the current network deployment are retrieved. Next, at operation [2], network policy rules to be applied and conditions (e.g., DNN, APN, IMSI range, etc.) for rule activation in each instance in the current network deployment are retrieved. At operation [3], a policy activation list with policy rules and conditions (e.g., an IMSI set, APN/DNN set, etc.) is provided to learn and evaluate the deployed policy.

Next, several operations are performed to determine the best matches for groups and/or the best matches for policies. For example, at operation [4], a set (e.g., groups, size of groups, participant information, a number of participants, referenced rules, etc.) can be recommended by the group recommendation engine. As discussed above, if there are existing enterprise groups to consider when generating the groupings, at operation [5], a determination can be made to include enterprise groups in the grouping calculus. Next, at operation [6], enterprise groups can be fetched from the enterprise grouping tables and can be provided to the group recommendation engine. Then, at operation [7], the enterprise groups including, for example, Group_ID, lists of members/participants, IMSI information, etc., can be provided to the group decision maker.

Continuing with the example of FIGS. 4A-4B, at operation [8], the best matching groups can be computed and at operation [9], the best matching policy group mappings can be computed. That is, at operation [8] and operation [9], groups and/or policy group mappings can be optimized by the group decision maker prior to provision the groups to the new network deployment.

Next, several operations are performed to provision the groups (e.g., the optimized groups discussed above) to the new network deployment. For example, at operation [10], the group decision maker can provide a desired group set, which can include a Group_ID, a member list, etc., to the group provisioning function. Next, at operation [11], the group provisioning function can provision the groups to subscriber profiles for each IMSI to the subscriber data management server.

Subsequently, several operations are performed to provision policies to the network based on group to policy relationships. For example, at operation [12], policies are provisioned to the new network deployment. Next, at operation [13], local policies are provisioned to each instance in the new network deployment. Then, at operation [14], group to local policy mappings are provisioned to each instance in the new network deployment. Next, at operation [15], network policies are provisioned to each instance in the new network deployment. Then, at operation [16], group to network policy mappings are provisioned to each instance in the new network deployment. At this stage, the new network deployment is now provisioned with local policies and network policies that have been selected per data session based on group membership of each IMSI.

Figure 5A:
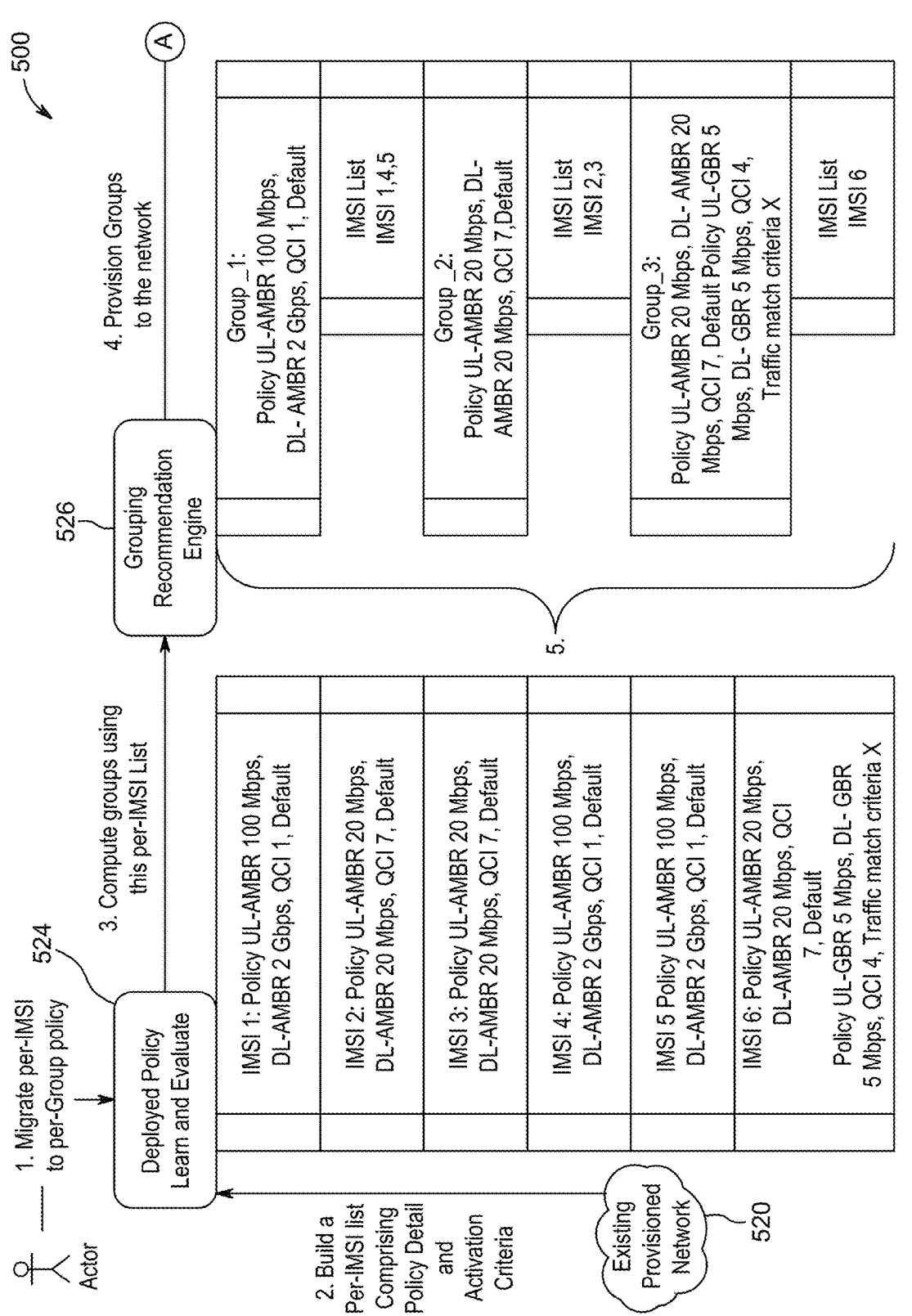
FIGS. 5A-5B illustrate an example flow for policy optimization for cellular network deployment.
Figure 5B:
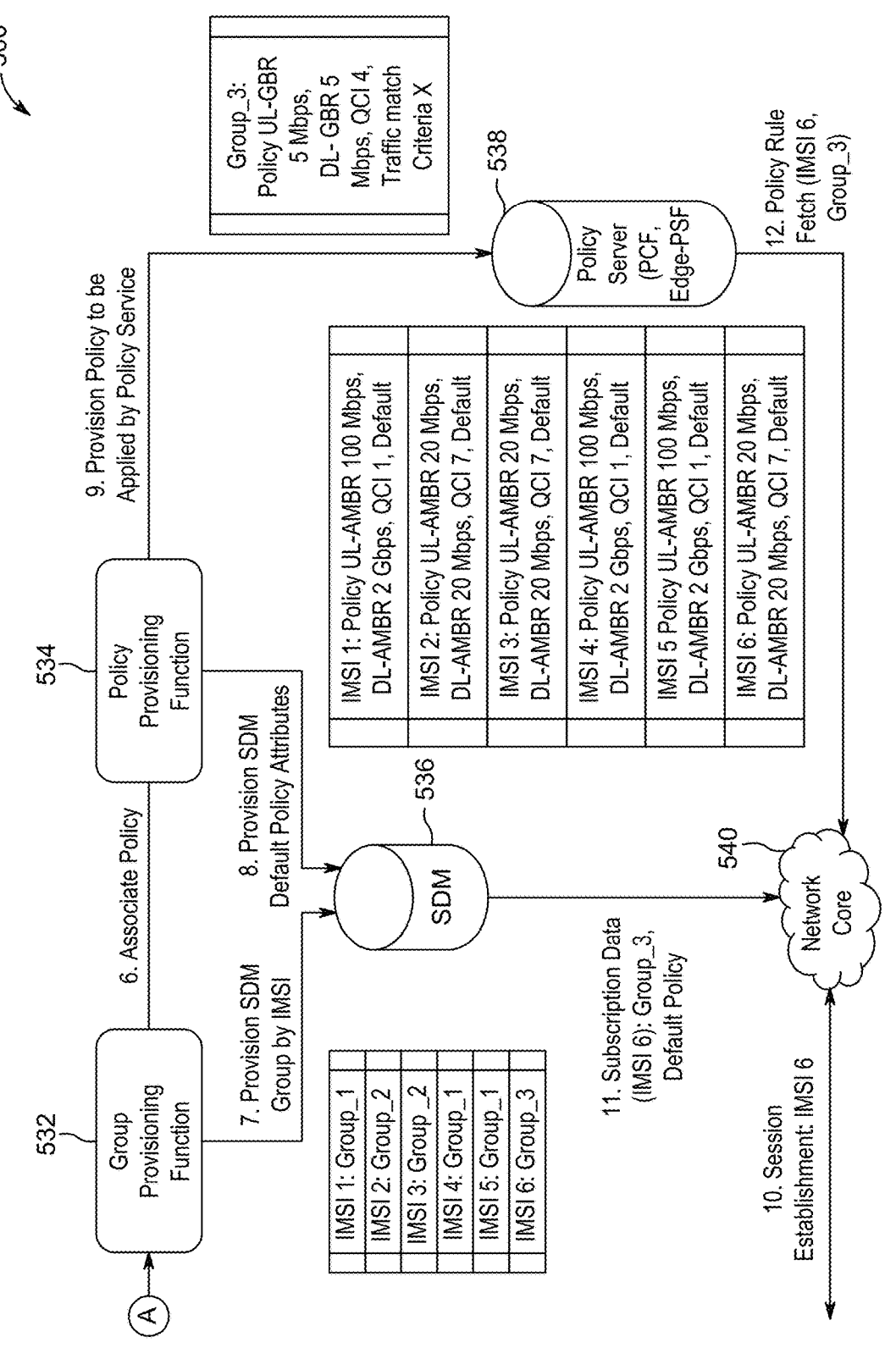

FIGS. 5A-5B illustrate an example flow for policy optimization for cellular network deployment. The flow 500 shows the various steps that occur between the existing provisioned network 520, the deployed policy learn and evaluate 524 phase, the grouping recommendation engine 526, the group provisioning function 532, and the policy provisioning function 534. In some implementations, the existing provisioned network 520 can be associated with the current network deployment 302 of FIG. 3; the deployed policy learn and evaluate 524 phase can be analogous to operation 310 of FIG. 3; the grouping recommendation engine 526 can be analogous to the grouping recommendation engine 312 of FIG. 3; the group provisioning function 532 can be analogous to the group provisioning function 316 of FIG. 3; and the policy provisioning function 534 can be analogous to the policy provisioning function 318 of FIG. 3.

The non-limiting example shown in FIGS. 5A-5B illustrates a scenario in which the grouping techniques described herein are applied to a set of six IMSIs. In this non-limiting example, IMSIs 1, 4, and 5 share a same (or "first") default policy requirement, while IMSIs 2 and 3 share a different (or "second") default policy requirement. Further, in this non-limiting example, IMSI 6 has the same default policy requirement as IMSI 2 and IMSI 3, but IMSI 6 also has a guaranteed bit rate (GBR) policy.

It will be appreciated that the quantity of IMSIs described in this non-limiting example can vary without departing from the scope of the disclosure and, similarly, the numbering (e.g., IMSI 1, IMSI 2, etc.) of the IMSIs can vary without departing from the scope of the disclosure. Accordingly, any quantity of IMSIs each having different and/or shared default policy requirements are contemplated herein.

In this non-limiting example, at operation [1], an actor (e.g., a (e.g., user, a sysadmin, administrator, network development team member, etc.) can make a decision to migrate an existing network to a new network. As discussed herein, this migration can involve migrating subscribers from a current network deployment to a new network deployment based on policies, such as IMSI to group policies. At operation [2], a list including policy details and/or activation details can be built a per-IMSI basis for IMSIs associated with the existing provisioned network.

Next, at operation [3], the deployed policy learn and evaluate 524 phase can compute various groups using the list constructed at operation [2] and provide this list to the grouping recommendation engine 526. At operation [4], the grouping recommendation engine 526 can provision groups to the network by providing group recommendations to the group provisioning function 532. Examples of such groups are shown at operation [5].

At operation [6], the group provisioning function 532 can associate policies for the groups to policy provisioning function 534. In addition, at operating [7], the group provisioning function 532 can provision IMSI groups to a subscriber data management server (e.g., the SDM 536, which can be analogous to the subscriber data management server 322 of FIG. 3). At operation [8], the policy provisioning function 534 can provision default policy attributes to the subscriber data management server (e.g., the SDM 536).

At operation [9], the policy provisioning function 534 provisions policies to be applied to the new network on a per-policy-service basis to a policy server (e.g., the policy service 538, which can be analogous to the policy server 328 of FIG. 3). At operation [11], subscription data can be provided to a network core 540, which can be analogous to the planned network deployment 324 of FIG. 3. In addition, at operation [12], policy rules can be provided to the network core 540. In some implementations, as shown at operation [10], a session can be established for one or more IMSIs in the planned network deployment.

In general, the non-limiting example of FIGS. 5A-5B show a scenario in which a particular group (e.g., Group_3) is used to determine the rules for GBR services for a particular IMSI (e.g., IMSI 6). This can occur in addition to the default policy provided by, for example subscription data associated with IMSI 6. This can be expanded for multiple IMSIs requiring this GBR service and the same default policy by placing all such IMSIs in Group_3 that uses the same single entry in the policy service.

An alternative approach would be to have IMSI 6 in two groups, Group_2 and Group_3. In this case Group_3 policy created by the grouping recommendation engine 526 would only contain the GBR component. Both groups can be provided in the subscription data and passed to the Policy Service on session establishment in such implementations. In such scenarios, the policy service 538 could have a reference for Group_3 but not for Group_2. However, it depends on whether the policy service 538 is configured to be responsible for the default policy or not and both scenarios are contemplated within the scope of the disclosure.

Figure 6:
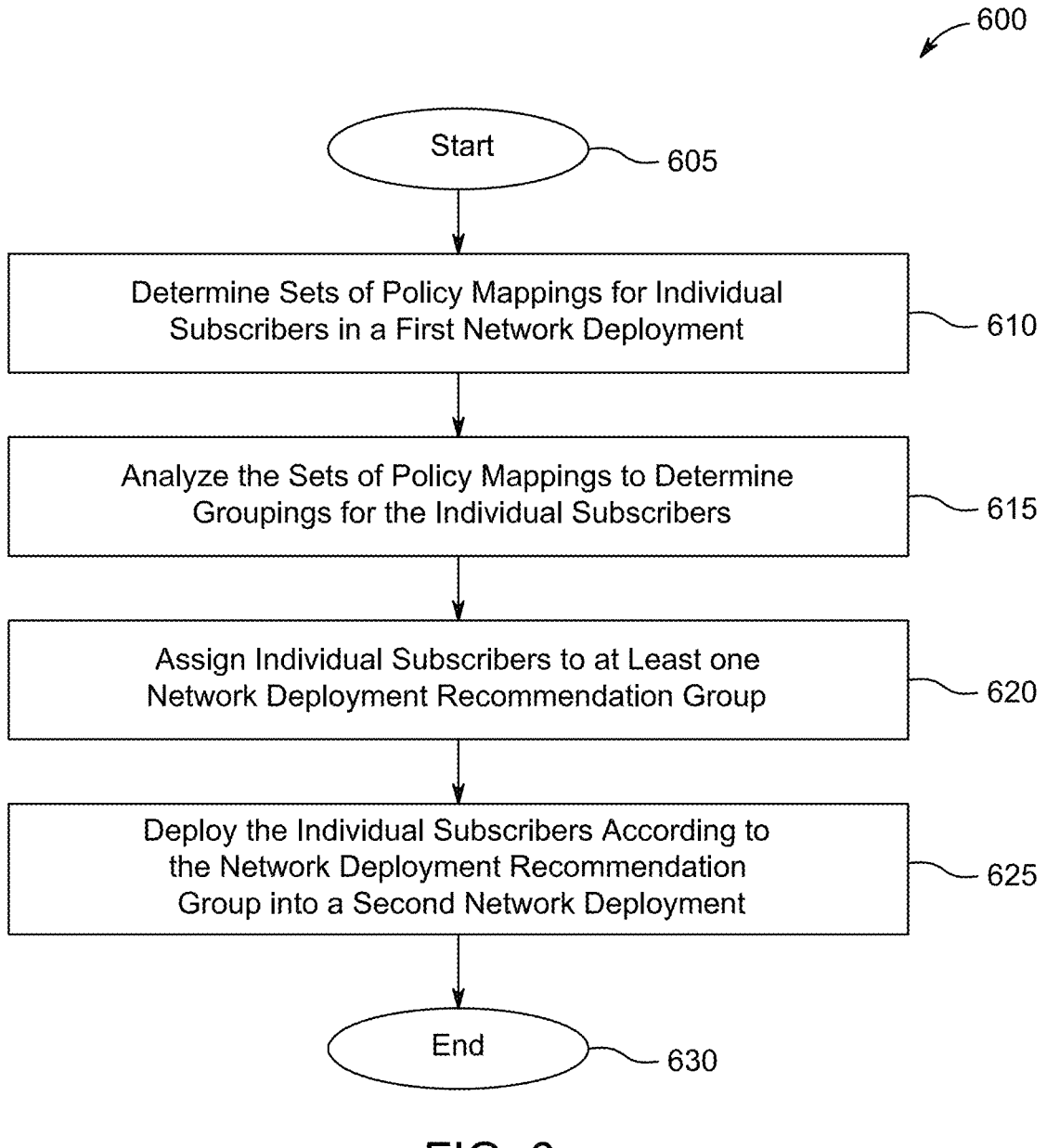
FIG. 6 illustrates an example procedure for policy optimization for cellular network deployment.

In closing, FIG. 6 illustrates an example simplified procedure for policy optimization for cellular network deployment in accordance with one or more embodiments described herein. For example, a non-generic, specifically configured device (e.g., device 200, an apparatus) and/or system (e.g., system 300) may perform procedure 600 by executing stored instructions (e.g., process 248). The procedure 600 may start at step 605, and continues to step 610, where, as described in greater detail above, sets of policy mappings are determined for individual subscribers among a plurality of network subscribers in a first network deployment. In some implementations, the individual subscribers may each have a unique international mobile subscribed identity (e.g., an IMSI) associated therewith.

In some implementations, the sets of policy mappings can include at least one policy selected from a list consisting of: quality of service policies; bitrate subscription policies; uplink rates; downlink rates; application execution; parental control policies; and subscription policies, although implementations are not so limited.

The procedure 600 may continue to step 615, where, as described in greater detail above, the sets of policy mappings are analyzed to determine a plurality of groupings for the individual subscribers. In some implementations, the procedure 600 can further include provisioning a relationship between the plurality of network deployment recommendation groups and the sets of mappings in a local policy database or an external policy database, as described above.

The procedure 600 may continue to step 620, where, as described in greater detail above, the individual subscribers are assigned, according to the set of policy mappings and the plurality of groupings, to at least one network deployment recommendation group among a plurality of network deployment recommendation groups. In some implementations, at least one individual subscriber among the individual subscribers can be assigned to more than one of the plurality of network deployment recommendation groups.

The procedure 600 may continue to step 625, where, as described in greater detail above, the individual subscribers are deployed according to the plurality of network deployment recommendation groups into a second network deployment. In some implementations, the sets of policy mappings can be written to a database in response to deploying the individual subscribers into the second network deployment. That is, in some implementations, the procedure 600 can include writing the sets of policy mappings to a database in response to deploying the individual subscribers into the second network deployment. In some implementations, the procedure 600 can further include providing the plurality of network deployment recommendation groups to a network administrator for approval prior to deploying the individual subscribers in the second network deployment.

In some implementations, the procedure 600 can further include determining that the first network deployment and the second network deployment are enterprise network deployments; determining that recommendations for the plurality of groupings are associated with the enterprise network deployment; and associating an enterprise group to each of the plurality of groupings. Implementations are not so limited, however, and in some implementations, the procedure 600 can further include determining that the first network deployment and the second network deployment are non-enterprise network deployments; identifying a telecommunications protocol group, such as a third-generation partnership project (e.g., a 3GPP) group for each of the plurality of groupings; and associating a respective telecommunications protocol (e.g., third-generation partnership project) group to each of the plurality of groupings.

As discussed above, in some implementations, the procedure 600 can further include identifying a telecommunications protocol, such as a third-generation partnership project, group for each of the plurality of network deployment recommendation groups approved by a network administrator; and deploying the plurality of network deployment recommendation groups approved by the network administrator according to the telecommunications protocol (e.g., the third-generation partnership project)t group for each of the plurality of network deployment recommendation groups.

In some implementations, analyzing the sets of policy mappings to determine the plurality of groupings for the individual subscribers comprises analyzing network policy rules selected from a group consisting of: digital network names; access point names; and international mobile subscribed identity ranges. In addition to, or in the alternative, in some implementations, assigning the individual subscribers to at least one network deployment recommendation group according to the set of policy mappings and the plurality of groupings comprises: determining best match groups based on referenced rules, enterprise groupings, international mobile subscribed identity rules, and group sizes.

Procedure 600 may end at step 630.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: determining sets of policy mappings for individual subscribers among a plurality of network subscribers in a first network deployment; analyzing the sets of policy mappings to determine a plurality of groupings for the individual subscribers; assigning, according to the set of policy mappings and the plurality of groupings, the individual subscribers to at least one network deployment recommendation group among a plurality of network deployment recommendation groups; and deploying the individual subscribers according to the plurality of network deployment recommendation groups into a second network deployment.

In still other implementations, a tangible, non-transitory, computer-readable medium storing program instructions that cause a device to execute a process comprising: determining sets of policy mappings for individual subscribers among a plurality of network subscribers in a first network deployment; analyzing the sets of policy mappings to determine a plurality of groupings for the individual subscribers; assigning, according to the set of policy mappings and the plurality of groupings, the individual subscribers to at least one network deployment recommendation group among a plurality of network deployment recommendation groups; and deploying the individual subscribers according to the plurality of network deployment recommendation groups into a second network deployment.

The techniques described herein, therefore, provide for policy optimization for cellular network deployment. More specifically, the techniques herein provide mechanisms in which groupings based on subscriber policies are formed and optimized prior to migrating network policies to a new network deployment. In addition, the subscriber policies can be provisioned on a per group basis prior to migrating network policies to a new network deployment. These and other features of the disclosure can allow for a reduction in the costs associated with computing resources, as well as licensing and other standardization and/or legal resources to support a network migration, a network re-architecture, and/or a network deployment.

Illustratively, the techniques described herein may be performed by hardware, software, and/or firmware, (e.g., an "apparatus") such as in accordance with the policy optimization process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In addition, while certain devices are shown, and with certain functionality being performed on certain devices, other suitable devices and process locations may be used, accordingly.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein. What is claimed is:

What is claimed is:

1. A method, comprising:
determining, by a process, sets of policy mappings for individual subscribers among a plurality of network subscribers operating in a first network deployment, wherein the sets of policy mappings include at least one policy selected from a list consisting of: quality of service policies; bitrate subscription policies; uplink rates; downlink rates; application execution; parental control policies; and subscription policies;
analyzing, by the process, the sets of policy mappings to determine a plurality of groupings for the individual subscribers;
assigning, by the process and according to the sets of policy mappings and the plurality of groupings, the individual subscribers to at least one network deployment recommendation group among a plurality of network deployment recommendation groups; and
deploying, by the process, each individual subscriber according to their assigned network deployment recommendation group into a second network deployment different from the first network deployment.

2. The method of claim 1, wherein the individual subscribers each have a unique international mobile subscribed identity associated therewith.

3. The method of claim 1, wherein at least one individual subscriber among the individual subscribers is assigned to more than one of the plurality of network deployment recommendation groups.

4. The method of claim 1, further comprising:
writing, by the process, the sets of policy mappings to a database in response to deploying the individual subscribers into the second network deployment.

5. The method of claim 1, further comprising:
determining, by the process, that the first network deployment and the second network deployment are enterprise network deployments;
determining, by the process, that recommendations for the plurality of groupings are associated with the enterprise network deployments; and
associating an enterprise group to each of the plurality of groupings.

6. The method of claim 1, further comprising:
determining, by the process, that the first network deployment and the second network deployment are non-enterprise network deployments;
identifying a telecommunications protocol group for each of the plurality of groupings; and
associating a respective telecommunications protocol group to each of the plurality of groupings.

7. The method of claim 1, further comprising:
providing, by the process, the plurality of network deployment recommendation groups to a network administrator for approval prior to deploying the individual subscribers in the second network deployment.

8. The method of claim 1, further comprising:
identifying a telecommunications protocol group for each of the plurality of network deployment recommendation groups approved by a network administrator; and
deploying the plurality of network deployment recommendation groups approved by the network administrator according to the telecommunications protocol group for each of the plurality of network deployment recommendation groups.

9. The method of claim 1, further comprising:
provisioning, by the process, a relationship between the plurality of network deployment recommendation groups and the sets of policy mappings in a local policy database or an external policy database.

10. The method of claim 1, wherein analyzing the sets of policy mappings to determine the plurality of groupings for the individual subscribers comprises analyzing network policy rules selected from a group consisting of: digital network names; access point names; and international mobile subscribed identity ranges.

11. The method of claim 1, wherein assigning the individual subscribers to at least one network deployment recommendation group according to the sets of policy mappings and the plurality of groupings comprises: determining best match groups based on referenced rules, enterprise groupings, international mobile subscribed identity rules, and group sizes.

12. An apparatus, comprising:
one or more network interfaces to communicate with a network;
a processor coupled to the one or more network interfaces and configured to execute one or more processes; and
a memory configured to store a process that is executable by the processor, the process comprising:
determining sets of policy mappings for individual subscribers among a plurality of network subscribers operating in a first network deployment, wherein the sets of policy mappings include at least one policy selected from a list consisting of: quality of service policies; bitrate subscription policies; uplink rates; downlink rates; application execution; parental control policies; and subscription policies;

analyzing the sets of policy mappings to determine a plurality of groupings for the individual subscribers;

assigning, according to the sets of policy mappings and the plurality of groupings, the individual subscribers to at least one network deployment recommendation group among a plurality of network deployment recommendation groups; and deploying each individual subscriber according to their assigned network deployment recommendation group into a second network deployment different from the first network deployment.

13. The apparatus of claim 12, wherein at least one individual subscriber among the individual subscribers is assigned to more than one of the plurality of network deployment recommendation groups.

14. The apparatus of claim 12, wherein the process further comprises:

writing the sets of policy mappings to a database in response to deploying the individual subscribers into the second network deployment.

15. The apparatus of claim 12, wherein the process further comprises:

determining that the first network deployment and the second network deployment are enterprise network deployments;

determining that recommendations for the plurality of groupings are associated with the enterprise network deployments; and associating an enterprise group to each of the plurality of groupings.

16. The apparatus of claim 12, wherein the process further comprises:

determining that the first network deployment and the second network deployment are non-enterprise network deployments;

identifying a telecommunications protocol group for each of the plurality of groupings; and associating a respective telecommunications protocol group to each of the plurality of groupings.

17. The apparatus of claim 12, wherein the process further comprises:

identifying a telecommunications protocol group for each of the plurality of network deployment recommendation groups approved by a network administrator; and deploying the plurality of network deployment recommendation groups approved by the network administrator according to the telecommunications protocol group for each of the plurality of network deployment recommendation groups.

18. The apparatus of claim 12, wherein analyzing the sets of policy mappings to determine the plurality of groupings for the individual subscribers comprises analyzing network policy rules selected from a group consisting of: digital network names; access point names; and international mobile subscribed identity ranges.

19. A tangible, non-transitory, computer-readable medium storing program instructions that cause a device to execute a process comprising:

determining sets of policy mappings for individual subscribers among a plurality of network subscribers operating in a first network deployment, wherein the sets of policy mappings include at least one policy selected from a list consisting of: quality of service policies; bitrate subscription policies; uplink rates; downlink rates; application execution; parental control policies; and subscription policies;

analyzing the sets of policy mappings to determine a plurality of groupings for the individual subscribers;

assigning, according to the sets of policy mappings and the plurality of groupings, the individual subscribers to at least one network deployment recommendation group among a plurality of network deployment recommendation groups; and deploying each individual subscriber according to their assigned network deployment recommendation group into a second network deployment different form the first network deployment.

* * * * *